US012530177B1

(12) United States Patent
Kumar et al.

(10) Patent No.: US 12,530,177 B1
(45) Date of Patent: Jan. 20, 2026

(54) DATA FLOW ANALYSIS OF CLOUD-BASED SOFTWARE APPLICATIONS

(71) Applicant: Amazon Technologies, Inc., Seattle, WA (US)

(72) Inventors: Ankit Kumar, Minneapolis, MN (US); Andrew Thomas Walter, Boston, MN (US); Jared Curran Davis, Cedar Park, TX (US); Andrew Jude Gacek, Maple Grove, MN (US); Vaibhav Bhushan Sharma, Cupertino, CA (US); Richard Drews Dean, Seattle, WA (US); Harsh Raju Chamarthi, San Jose, CA (US); Jingmei Hu, San Jose, CA (US); Liana Sorina Hadarean, Sunnyvale, CA (US); Aritra Sengupta, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 18/082,411

(22) Filed: Dec. 15, 2022

(51) Int. Cl.
*G06F 9/44* (2018.01)
*G06F 8/41* (2018.01)
*G06F 9/54* (2006.01)

(52) U.S. Cl.
CPC ............... *G06F 8/433* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 9,158,604 B1 * | 10/2015 | Christodorescu | ....... G06F 9/547 |
| 11,036,614 B1 * | 6/2021 | Huang | ................ G06F 11/3608 |
| 11,321,218 B1 * | 5/2022 | Hicks | ........................ G06F 8/53 |
| 2016/0217029 A1 * | 7/2016 | Yoon | .................... G06F 11/3604 |
| 2024/0073223 A1 * | 2/2024 | Weizman | ............ H04L 12/4675 |

OTHER PUBLICATIONS

Khlyebnikov, "Tainted flow analysis and propagation across interfaces of IoT ecosystem" (Year: 2018).*

* cited by examiner

*Primary Examiner* — Insun Kang
(74) *Attorney, Agent, or Firm* — Nicholson De Vos Webster & Elliott LLP

(57) ABSTRACT

Techniques for data flow analysis of cloud-based software applications are described. A first portion of source code of a software application is determined to obtain data from a data source identified by a first resource identifier of a cloud provider network, the determination based on a mapping of a first statement in the first portion of the source code to an application programming interface (API) call. A trace of a data flow from the first portion of the source code to a second portion of the source code is obtained. A data sink identified by a second resource identifier of the cloud provider network is determined based on a mapping of a second statement in the second portion of the source code to another API call. A result that includes an identification of a data flow from the data source identified by the first resource identifier to the data sink identified by the second resource identifier is generated.

18 Claims, 10 Drawing Sheets

```
 1  PUBLIC STATIC VOID MAIN() {                            EXCERPTED
    ...                                               EXAMPLE SOURCE
31    STRING MODE = GETENVVAR("_MODE");                      CODE 221
32    STRING DBNAME = GETENVVAR("_DATABASE");
33    STRING DBID = "ARN:AWS:DYNAMODB:US-EAST-2:" + DBNAME;
34    STRING LOGID = GETENVVAR("_LOG");
    ...
40    DYNAMODBCLIENT DB = NEW DYNAMODBCLIENT(DBID,...);
41    CLOUDWATCHLOGGER LOGGER = NEW CLOUDWATCHLOGGER(...,LOGID);
42    PAYMENTSPROCESSOR PROCESSOR =
          NEW PAYMENTSPROCESSOR("ARN:AWS:EC2:US-EAST-2:
            CUSTXYZ:PP" + PPID);
    ...
55    STRING CARDNUMBER = DB.GETITEM("CREDITCARDNUMBER");
    ...
59    PROCESSOR.PROCESSPAYMENT(CART, CARDNUMBER);
    ...
63    IF (MODE == "DEBUG")
64       LOGGER.LOG(CART, CARDNUMBER);
    ...
201   STRING ENCRYPTEDCARDNUMBER = ENCRYPT(CARDNUMBER);
202   STRING DB2ID = "ARN:AWS:DYNAMODB:US-EAST-2:XYZ789";
203   DYNAMODBCLIENT DB2 = NEW DYNAMODBCLIENT(DB2ID,...);
204   DB2.PUTITEM("CREDITCARDNUMBER", ENCRYPTEDCARDNUMBER);
    ...
```

LINE NUMBERS

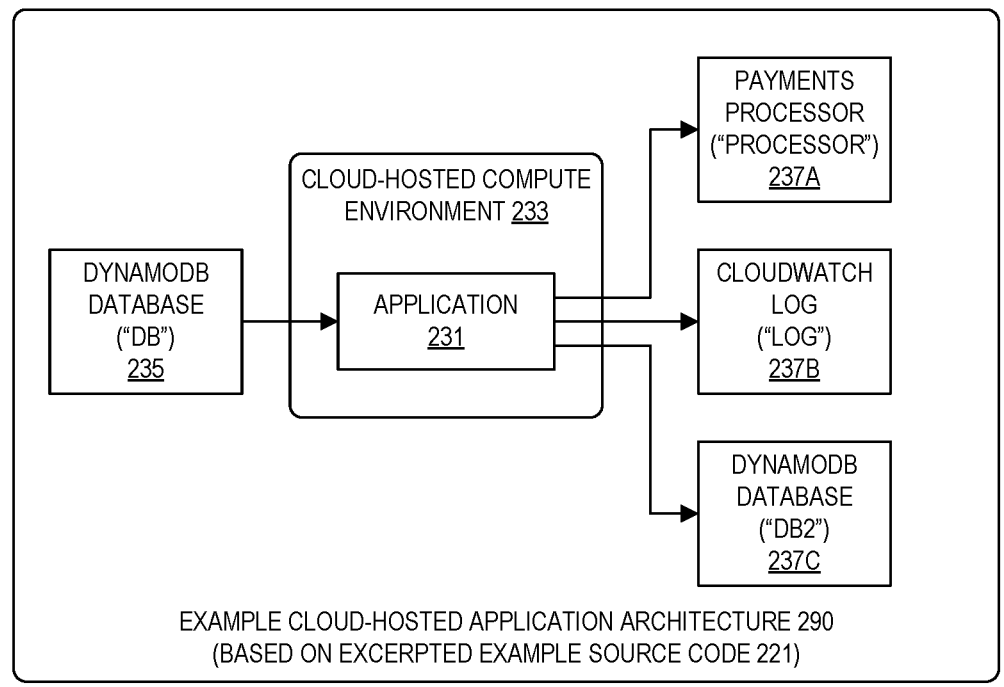

EXAMPLE CLOUD-HOSTED APPLICATION ARCHITECTURE 290
(BASED ON EXCERPTED EXAMPLE SOURCE CODE 221)

FIG. 2

DATA FLOW ANALYSIS OF CLOUD-BASED SOFTWARE APPLICATIONS

BACKGROUND

Entities are incorporating computers and software services into many facets of their business. These entities are using software to provide increasingly complex services. The complexity of these services has, in turn, increased the functionality required from the software that provides these services. The increased complexity in the software development process has made the task of administering and managing software challenging.

Ensuring that application data is not inadvertently leaked by software services is important in maintaining customer trust, satisfying regulatory requirements, preventing fraud, and authoring sound applications. Modern systems that run software on cloud resources increase the risk of inadvertent data exfiltration given the potential number of data destinations as compared to legacy on-premises software deployments where systems would be physically or electrically isolated.

BRIEF DESCRIPTION OF DRAWINGS

Various examples in accordance with the present disclosure will be described with reference to the drawings, in which:

FIG. 2 illustrates exemplary source code of a cloud-based software application and a corresponding used to motivate certain examples described herein.

DETAILED DESCRIPTION

Figure 1:
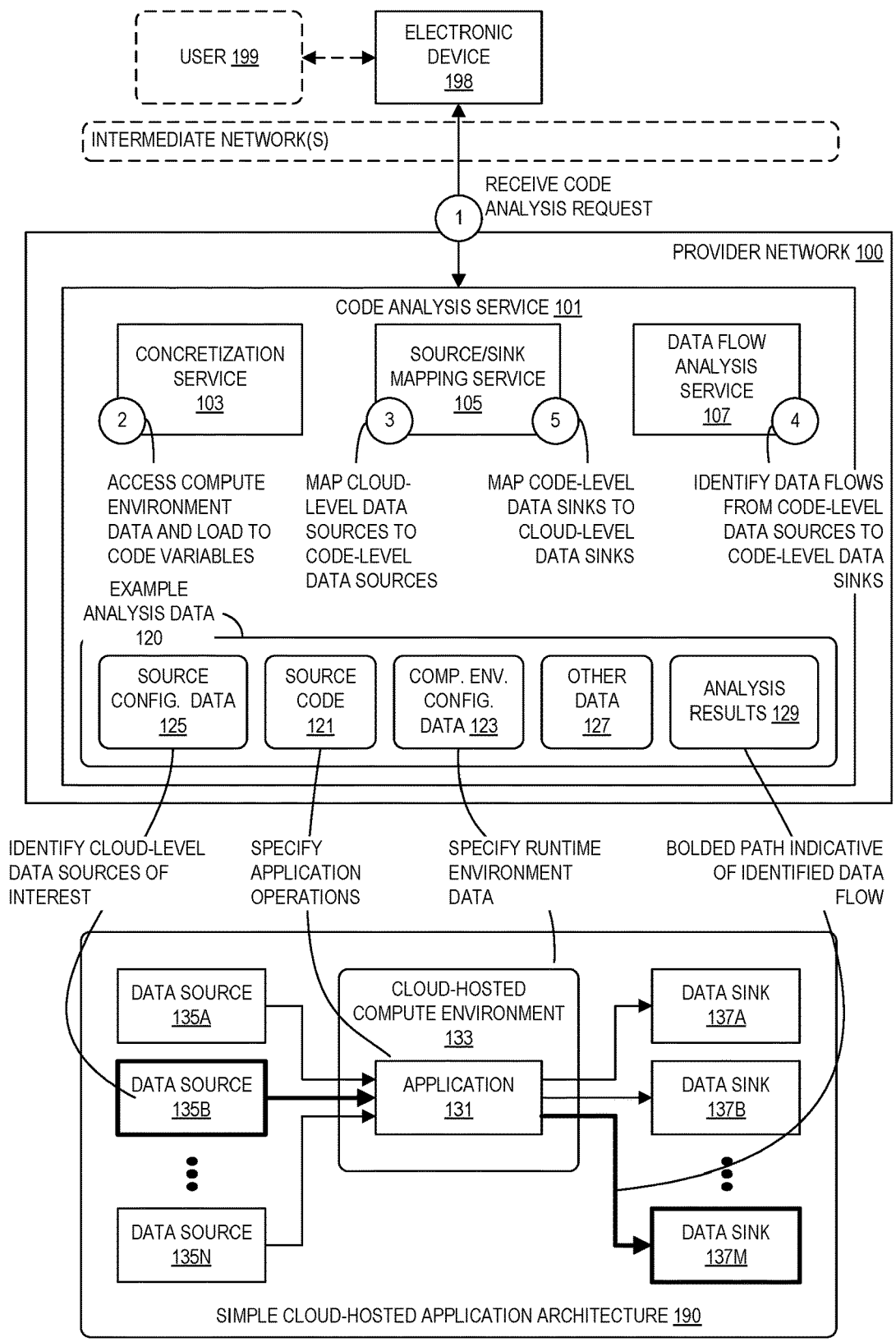
FIG. 1 illustrates an environment including an exemplary code analysis service for data flow analysis of cloud-based software applications according to some examples.

The present disclosure relates to methods, apparatus, systems, and non-transitory computer-readable storage media for data flow analysis in cloud-based software applications. According to some examples, a code analysis system performs data flow analysis by evaluating the source code of an application against its operational context within the cloud environment to determine whether any data of interest is potentially being exfiltrated in unknown or unwanted ways. Cloud-based software applications can execute in a variety of computing environments, can read data from a variety of data sources, and can write data to a variety of data sinks. The code analysis system described herein provides insights regarding data flows at the cloud-resource level (e.g., from and to other cloud-based resources) rather than at the source-code level (e.g., read and written in source code statements). In some examples, a user of the code analysis system can identify the source code of a cloud-based software application to analyze and any data sources of interest at the cloud-resource level. The code analysis system maps the cloud-level data sources of interest to code-level operations and evaluates the source code to determine whether the software application accesses a data source of interest. If so, the code analysis system performs data flow analysis (sometimes referred to as taint analysis) to trace where data accessed from the source of interest flows. The code analysis system can then map the code-level operations at the end of the trace(s) back to cloud-level data sinks and generate a result that includes an identification of the data flows from the cloud-level data sources to sinks.

Identifying undesirable data exfiltration risks in cloud-based software applications is challenging since modern cloud-based software applications are often composed of many different components and operate using many other systems and services running in the cloud. Data flow analysis tools can be used to identify data exfiltration risks by tracking how data flows through software applications, but existing data flow analysis tools are not well suited to cloud-based applications and often overinclusive in their reporting of risks. Tools operating at the cloud-level may analyze the networking and permissions configuration of a software application's components to determine potential data exfiltration pathways. Similarly, tools operating at the source-code level may analyze data flows at the source code level again to determine potential data exfiltration pathways. But potential risks are not real risks, and as a result, security engineers often must manually review large numbers of potential data exfiltration risks to evaluate whether the actual risk is real. Manually checking each identified risk can be a herculean effort requiring both domain expertise and time and can still be prone to human errors. These challenges are particularly emphasized in rapid development settings.

The aforementioned challenges, among others, are addressed by a code analysis system such as the one described herein that operates at the cloud-resource level. Cloud-level resources are typically identified using cloud-level resource identifiers. In some examples, the code analysis system uses API (application programming interface) data to map cloud-level resource identifiers to portions of source code that access the corresponding cloud-level resources. For example, to map from cloud-level data sources to code-level data sources, the code analysis system can identify the service or API associated with a cloud-based resource identifier based on the content or form of the identifier. The code analysis system can then use the API data to identify the corresponding statement(s) in the code that access that API based on the cloud-resource identifier. The code analysis system can then perform data flow analysis (e.g., by taint analysis using static code analysis techniques such as symbolic code execution or abstract code interpretation) to trace where in the source code that the accessed data is used. The code analysis system can then use the API data to map these code-level data sinks to cloud-level data sinks.

In some examples, the code analysis service performs code "concretization" to allow the data flow analysis to be carried out on certain cloud-based resources that are usually unknown until runtime. Concretization can be performed by, for example, introducing environment data into the data flow analysis of the source code of a software application. The code analysis service can determine the computing environment that will execute the software application, obtain the associated environment data, and use that data to affect the analysis. For example, the source code may read from a database in the cloud that is identified by an environment variable. The code analysis service can evaluate whether the source code running in a particular computing environment will access a particular database of interest by introducing the identifier of the database into the data flow analysis.

FIG. 1 illustrates an environment for data flow analysis of cloud-based software applications according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/ accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A code analysis service 101 provides users (e.g., customers of the provider network 100) with the ability to analyze application data flows at the cloud-level by static analysis of their source code. Static source code analysis typically involves analyzing source code without fully executing it such as by launching it on a managed compute service. In some examples, the code analysis service 101 itself may be provided as a service or application executing on one or more host computer systems of the provider network 100 via a managed compute service. In other examples, the code analysis service 101 can be executed in other environments such as on-prem with a user's own hardware (e.g., as an application running on a computer system that is not a part of a cloud provider network).

To illustrate cloud-level code analysis, consider the simple cloud-hosted application architecture 190 illustrated at the bottom of FIG. 1. An application 131 executing in a cloud-hosted compute environment 133 retrieves or otherwise obtains data from data sources 135A-135N and stores or otherwise sends data to data sinks 137A-137M. Data flows are typically one-to-many with data from a particular cloud-level data source flowing to one or more cloud-level data sinks. Note that some data sources may also be data sinks and vice versa depending on how the application 131 operates (e.g., a read from and a write to a particular service of the cloud provider network 100 would make that service a data source for the read and a data sink for the write). Upon receiving a request from a user to perform a code analysis, the code analysis service 101 can identify, for example, a dataflow from data source 135B to data sink 137M as indicated in bold and provide an indication of that dataflow to the user.

An exemplary set of analysis data 120 supporting a cloud-level code analysis is shown. Analysis data can be stored in one or more storage devices (not shown) provided by a storage virtualization of the cloud provider network 100, for example. The analysis data 120 includes source code 121, compute environment configuration data 123, source configuration data 125, other data 127, and analysis results 129. The source code 121 can be authored in a variety of languages (e.g., C, C++, C#, Java, Javascript, Node.js, Python, etc.) and defines the operation of the application to be analyzed (e.g., the application 131). The user can submit the source code 121 or a location of the source code 121 to be analyzed with a code analysis request to the code analysis service 101. Other data 127 can include user-specified API definitions for providing cloud-to-code or code-to-cloud level mappings, allowed data sinks, etc.

The compute environment configuration data 123 generally includes environment data about a compute environment in which the application will operate (e.g., the cloud-hosted compute environment 133). The compute environment configuration data 123 may vary depending on the target compute environment. At a high level, the compute environment configuration data 123 allows a code author to leave certain application inputs unspecified until execution only to be later obtained by the application upon execution. This allows for the creation of more general applications, such as an application that fetches data from a database located within the same region within which the application itself is launched. Compute environment configuration data can be stored and accessed in a variety of ways. For example, the compute environment configuration data 123 can be stored in a file or definition (e.g., as a JSON object) passed along to a managed compute service upon the launch of an application. In other examples, the user may define the compute environment configuration with another service of the cloud provider network (not shown) that manages application configuration at launch. The user can submit the compute environment configuration data 123 or a location of the compute environment configuration data 123 with a code analysis request to the code analysis service 101.

The source configuration data 125 allows a user to identify cloud-level data sources of interest. Cloud-resources are often identified using a resource identifier. In Amazon Web Services (AWS), for example, an AWS Resource Name or ARN uniquely identifies resources in the cloud. For example, a particular table of a DynamoDB database may be identified as "ARN:AWS:DYNAMODB:US-EAST-2:123456789012:TABLE/MYDYNAMODBTABLE." In the illustration, a user has identified the data source 135B as the data source of interest whether because it contains sensitive data, out of simple curiosity, or otherwise. The source configuration data 125 typically includes a set of one or more resource identifiers for the code analysis service to evaluate as data flow data sources. In some examples, no resource identifiers may be identified, and the code analysis service 101 can perform an exhaustive analysis of each data source it is able to identify in the source code 121. The user can submit the source configuration data 125 or a location of the source configuration data 125 with a code analysis request to the code analysis service 101.

The analysis results 129 provide an indication to the user the identified data sinks for any data flows from data source(s) specified in the source configuration data 125. The results are typically provided at the cloud-level (e.g., as resource identifiers) and can include corresponding code-level references (e.g., as a line number or number(s)). In some examples, if the code analysis service 101 is unable to resolve the cloud-level data sink for a particular data flow, the code analysis service 101 can provide an indication of the code-level data sink. In the simple example, the analysis results 129 would identify that data flowed from the data source 135B to the data sink 137M. The analysis results 129 can be provided to the user in response to their code analysis request.

The other data 127 allows a user to further customize their code analysis. Exemplary other data 127 can include allowed data sinks (e.g., to filter certain data sinks from the analysis results) and definitions for any custom APIs which may serve as data sources or data sinks in the user's application architecture.

Exemplary high level operations of the code analysis service 101 are indicated at the circled numbers circle 1-5. The example code analysis service 101 includes a concretization service 103, a source/sink mapping service 105, and a data flow analysis service 107.

As indicated at circle "1," the code analysis service 101 receives a code analysis request from an electronic device 198 operated by a user 199 via one or more intermediate networks. The request can include or otherwise indicate the location of the source code 121, the compute environment configuration data 123, the source configuration data 125, and any other data 127. As illustrated, the request originates from outside of the cloud provider network 100 but can also originate from within the provider network from another device or service.

As indicated at circle "2," the concretization service 103 accesses compute environment data 123 to concretize the source code given a particular target environment (e.g., to resolve certain variables that would otherwise be unknown until runtime). In this manner, the concretization service 103 reduces the number of unknowns for the data flow analysis and tailors the analysis to a particular execution environment. For example, the concretization service 103 can access an environment variable in the compute environment data 123 and loads it into the corresponding variable within the source code. Additional details of an example concretization by the concretization service 103 are provided with reference to FIG. 3.

As indicated at circle "3," the source/sink mapping service 105 (or just "mapping service") maps cloud-level data sources to code-level data sources. The mapping service 105 leverages API data (not shown) that specifies relationships between cloud level data sources and the underlying, code-level mechanisms through which source code accesses them. In this manner, the mapping service 105 can identify the portions of code (e.g., one or more lines) that access the cloud-level data sources identified in the source configuration data 125. Additional details of an example data source cloud-to-code reconciliation by the mapping service 105 are provided with reference to FIG. 4.

As indicated at circle "4," the data flow analysis service 107 identifies data flows from the code-level data sources to code-level data sinks. Various code analysis techniques can be used generally falling under the umbrella of static code analysis and may include partial execution without actually executing the code and performing runtime analysis. For example, taint flow analysis can be used to track the flow of data from one code-level data source to code-level data sinks. As part of the analysis, the data flow analysis service 107 can perform constant propagation (sometimes referred to as constant folding) to determine how the application will move data of interest through the code and may leverage symbolic code execution and/or abstract code interpretation to, for example, simplify the number of paths under consideration. Additional details of an example data flow analysis are provided with reference to FIG. 5.

As indicated at circle "5," the mapping service 105 maps code-level data sinks to cloud-level data sinks. The mapping service 105 leverages API data (not shown) that specifies relationships between code-level mechanisms through which source code can access cloud-level data sinks. In this manner, the mapping service 105 can identify the portions of code (e.g., one or more lines) that store or otherwise send data of interest to cloud-level data sinks. Additional details of an example data sink code-to-cloud reconciliation by the mapping service 105 are provided with reference to FIG. 6.

Note that the operations at circles "1" to "5" are enumerated to describe different stages of a code analysis and not necessarily indicative of any staged or phased order of operations. In some examples, the concretization of variables, mapping of cloud-level data sources to code-level data sources, data flow analysis, and mapping of code-level data sinks to cloud-level data sinks are performed as the code analysis service 101 encounters variables that can be concretized, identifies code-level data sources that correspond to cloud-level data sources, tracks data flows through the code, etc.

FIG. 2 illustrates exemplary source code of a cloud-based software application and a corresponding used to motivate certain examples described herein. The excerpted example source code 221 provides lines of code of a toy cloud-hosted application architecture 290. In the example, the code 221 implements an application 231 that reads data from one data source—a database 235, such as an AWS DynamoDB database, and writes data to three data sinks—a payment processing service 237A, a log 237B such as an AWS CloudWatch log, and another database 237C such as an AWS DynamoDB database.

Here, the data source corresponds to the "DB" dynamodbclient object instantiation in the source code 221 at line 40, and the data sinks correspond to the "PROCESSOR" PAYMENTSPROCESSOR object instantiation in the code at line 42, the "LOG" CLOUDWATCHLOGGER object instantiation in the code 221 at line 41, and the "DB2" dynamodbclient object instantiation in the source code 221 at line 203.

Figure 3:
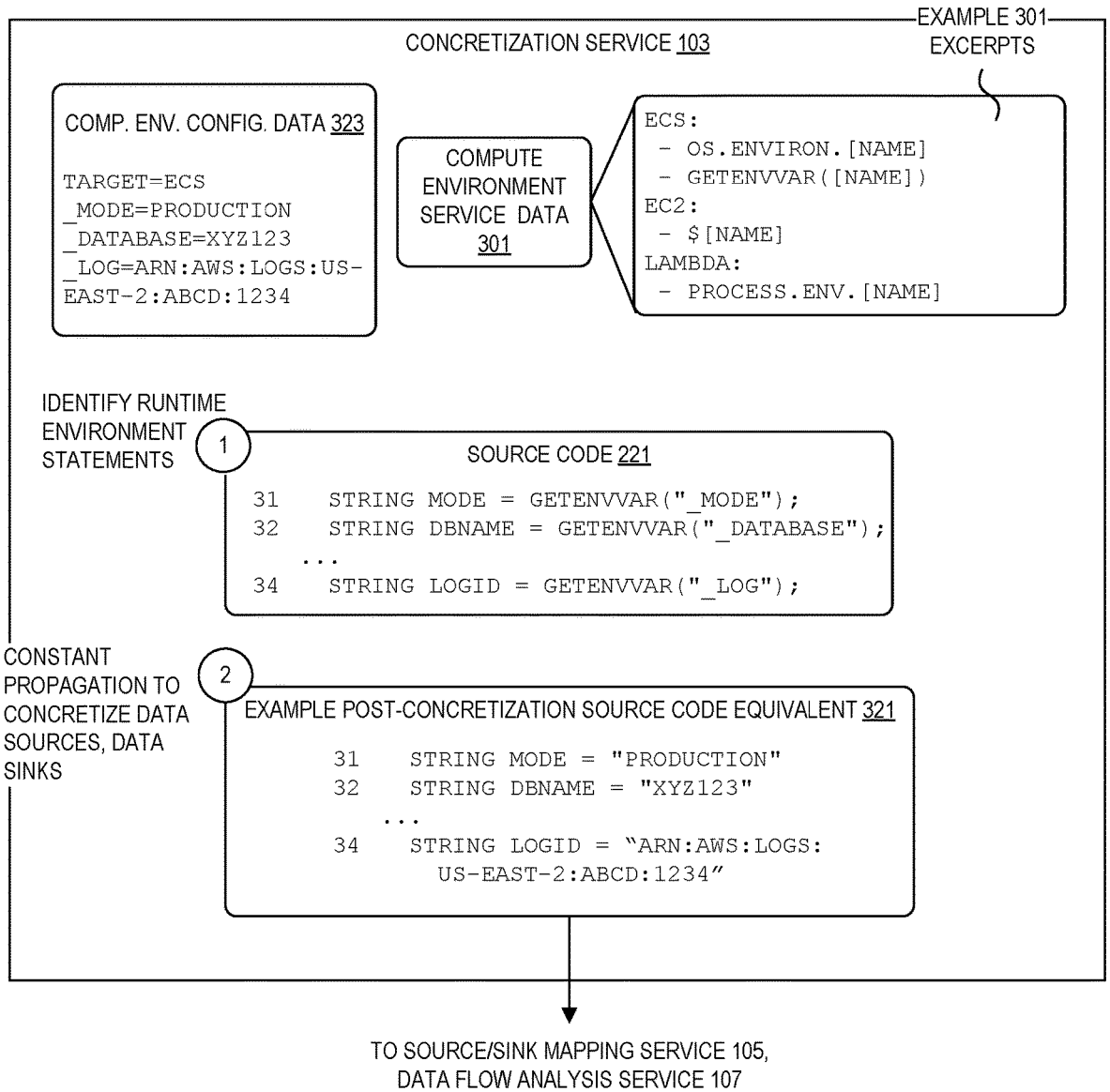
FIG. 3 illustrates code concretization by an exemplary concretization service of the exemplary code analysis service according to some examples.

FIG. 3 illustrates code concretization by an exemplary concretization service of the exemplary code analysis service according to some examples. The concretization service 103 develops partial context about the execution environment that the source code under analysis will run in. To do so, the concretization service 103 uses compute environment service data 301. Since the various mechanisms through which environment data can be loaded into managed compute services are known, the compute environment service data 301 can enumerate those mechanisms.

Example compute environment service data 301 excerpts are shown. For a container service (e.g., "ECS"), the compute environment service data 301 indicates that environment data can be referenced as OS.ENVIRON.[NAME] or retrieved using a GETENVVAR([NAME]) method where the [NAME] corresponds to the particular environment data to load. For a hardware virtualization service (e.g., "EC2"), the compute environment service data 301 indicates that environment data can be referenced as a [NAME] prefixed with the '$' symbol. For a serverless code execution service (e.g., "LAMBDA"), the compute environment service data 301 indicates that environment data can be referenced as PROCESS.ENV.[NAME], again where the [NAME] corresponds to the particular environment data to load.

Example compute environment configuration data 323 includes an indication of the target execution environment (ECS), and includes names for _MODE, _DATABASE, and _LOG. In other examples, the target environment in which the code under analysis will be run can be inferred based on matches of source code statements to the various code-level mechanisms through which environment data can be loaded as indicated in the compute environment service data 301 or specified by the user as part of a code analysis request.

As indicated at circle "1," the concretization service 103 can scan the source code 221 to identify locations of code statements corresponding to those identified in the compute environment service data 301 for the target compute environment. For example, at lines 31, 32, and 34, the source code 221 makes calls to the GETENVVAR( ) method in assignments to the variables MODE, DBNAME, and LOGID, respectively.

As indicated at circle "2," based on the corresponding names in the identified lines of code, the concretization service 103 can determine the values of those variable assignments using the compute environment configuration data 323 and propagate or fold those constants through other locations of the source code during the code analysis. Here, the result is shown as the example post-concretization source code equivalent 321 with the concretization service 103 assigning the string "MODE" the value "PRODUCTION" (line 31), the string "DBNAME" the value "XYZ123" (line 32), and the string "LOGID" the concatenated constant string and environment data "ARN:AWS:LOGS:US-EAST-2:ABCD:1234" (line 34).

Figure 4:
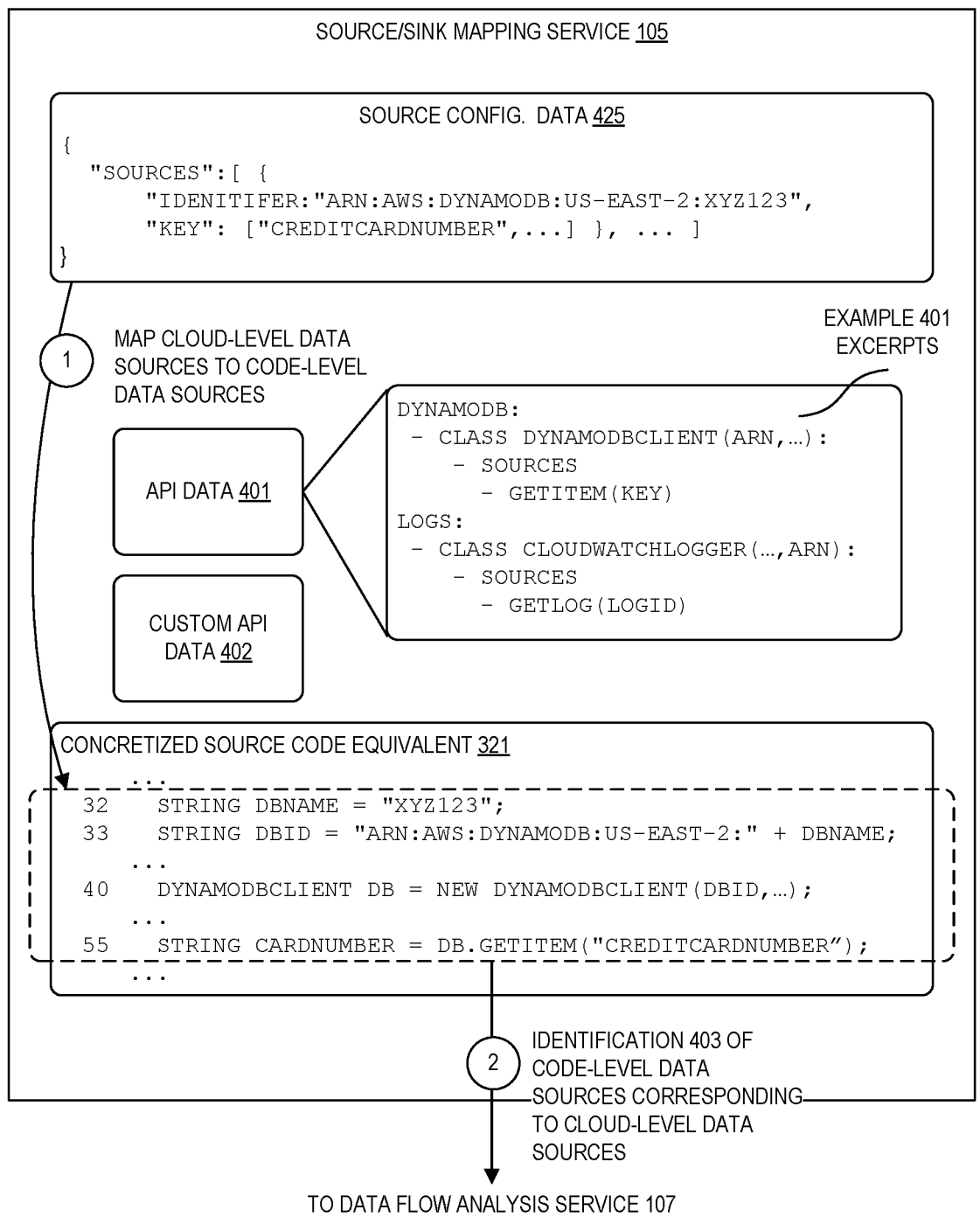
FIG. 4 illustrates cloud- to code-level data source identification by an exemplary mapping service of the code analysis service according to some examples.

FIG. 4 illustrates cloud- to code-level data source identification by an exemplary mapping service of the code analysis service according to some examples. The mapping service 105 determines code portions that access cloud-level data sinks. To do so, the mapping service 105 API data 401. In this mapping direction, the API data 401 provides a relation between a line or lines of code (generally referred to as a code "portion") and their cloud-level operation as a data source. In some examples, the API data 401 can be specified in a JSON file, a YAML file, another file type, within a database, etc.

Example API data 401 excerpts are shown. Since cloud-based data sources are accessed through APIs, the API data 401 can enumerate the code-level mechanisms that exercise those APIs. For example, some data sources may be accessed via a call to a method of a particular object with the object being provided by a supporting library or based on a compiler or interpreter for the target environment. As shown, the API data 401 can indicate that for a DynamoDB service, the GETITEM( ) method of a DYNAMODBCLIENT class instantiated with a first argument as the resource identifier is one data source. As another example, the API data 401 can indicate that for a logs service, the GETLOG( ) method of a CLOUDWATCHLOGGER class instantiated with a last argument as the resource identifier is another data source. In other examples, data sources may be accessed via a call to a particular method with the method being provided by a supporting library or based on a compiler or interpreter for the target environment. For example, an alternative to the illustrated DynamoDB data source might be a GETITEM( ) method that includes, as one of the arguments, the resource identifier of the database to access rather than the resource identifier being used to instantiate a DYNAMODBCLIENT object. Other mechanisms for accessing cloud-level data sources can be familiar to those skilled in the art and can be described in API data 401.

In some examples, the code analysis service 101 allows a user to specify custom API data 402 (e.g., included with or identified in a code analysis request). The custom API data 402 allows a user to define code-level mechanisms to access APIs of their own non-public data sources.

Source configuration data 125 allows users to specify the cloud-level data sources that are of interest. Different examples can support varying degrees of specificity in the identification of the data sources. For example, for a database data source, the source configuration data can allow the user to specify a particular table containing the data of interest, a particular or column containing the data of interest (e.g., for a SQL-based database), a particular key containing the database of interest (e.g., for a NoSQL based key-value store), etc. Example source configuration data 425 indicates that the user in this example is interested in data flows originating from a cloud-level data source having a resource identifier "ARN:AWS:DYNAMODB:US-EAST-2:XYZ123" and in particular from the key "CREDITCARDNUMBER."

As indicated at circle "1," using the API data 401, the source configuration data 425, and the concretized source code equivalent 321, the mapping service 105 can determine the portions of code that access the data of interest. In the illustrated example, the mapping service 105 determines through the resource identifier usage as the first parameter in the DB instantiation of the DYNAMODBCLIENT that DB is an object with access to the data source of interest at line 40 (with the concretization service 103 concretizing the DBID string at lines 32, 33 and propagating it to line 40). The mapping service further determines that the particular data of interest—the value of the key "CREDITCARDNUMBER"—is accessed using the GETITEM method of DB at line 55. In some examples, the mapping service 105 uses a portion of the resource identifier to determine which service manages the data source (e.g., the "DYANMODB" portion of the resource identifier). In other examples, the mapping service 105 evaluates whether any of the resources identified used in the program are of interest and attempts to fit any identified usage into one or more of the code-level data accesses included in the API data 401.

As indicated at circle "2," the mapping service 105 provides an identification 403 of the determined code-level data sources corresponding to the cloud-level data sources for data flow analysis by the data flow analysis service 107. In this example, the mapping service 105 can provide an indication that the CARDNUMBER variable at line 55 is a data source of interest.

Figure 5:
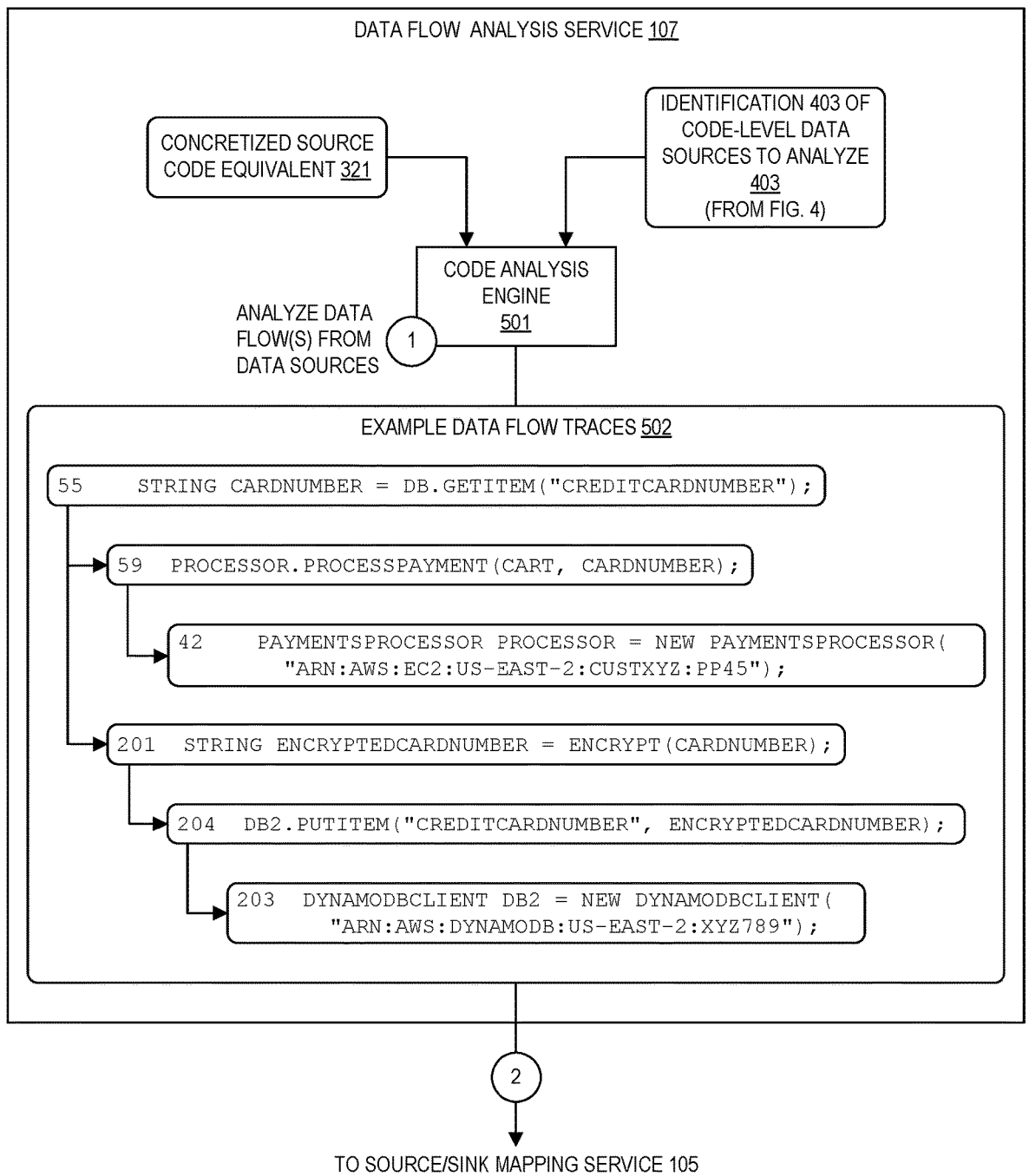
FIG. 5 illustrates an exemplary data flow analysis by an exemplary data flow analysis service of the exemplary code analysis service according to some examples.

FIG. 5 illustrates an exemplary data flow analysis by an exemplary data flow analysis service of the exemplary code analysis service according to some examples. The data flow analysis service 107 traces how data of interest flows through the source code. Sometimes called "taint" analysis, the data flow analysis service 107 uses static code analysis techniques to trace data through source code statements (e.g., symbolic code execution or abstract code interpretation). As illustrated, the data flow analysis service 107 includes a code analysis engine 501. As indicated at circle "1," using the concretized source code equivalent 321 and the identification 403 of data sources of interest, the code analysis engine 501 generates traces of those data sources through the source code.

Example data flow traces 502 are shown. The data source of interest—identified in the CARDNUMBER variable—is traced to a first code-level data sink at line 42 through the object method call at line 59 and a second code-level data sink at line 203 through the object method call PUTITEM at line 204 and the encrypt method at line 201.

As indicated at circle "2," the data flow analysis service 107 provides an indication of traces to the mapping service 105.

Returning to FIG. 2, note that the example traces 502 do not include a data sink at line 41 through the object method call at line 64 (corresponding to the LOG data sink 237B). This is because the concretized source code equivalent has resulted in the code analysis engine 501 evaluating the conditional at line 63 to false given the MODE variable was concretized as "PRODUCTION." In other words, in the example targeted runtime environment, the log is disabled.

Figure 6:
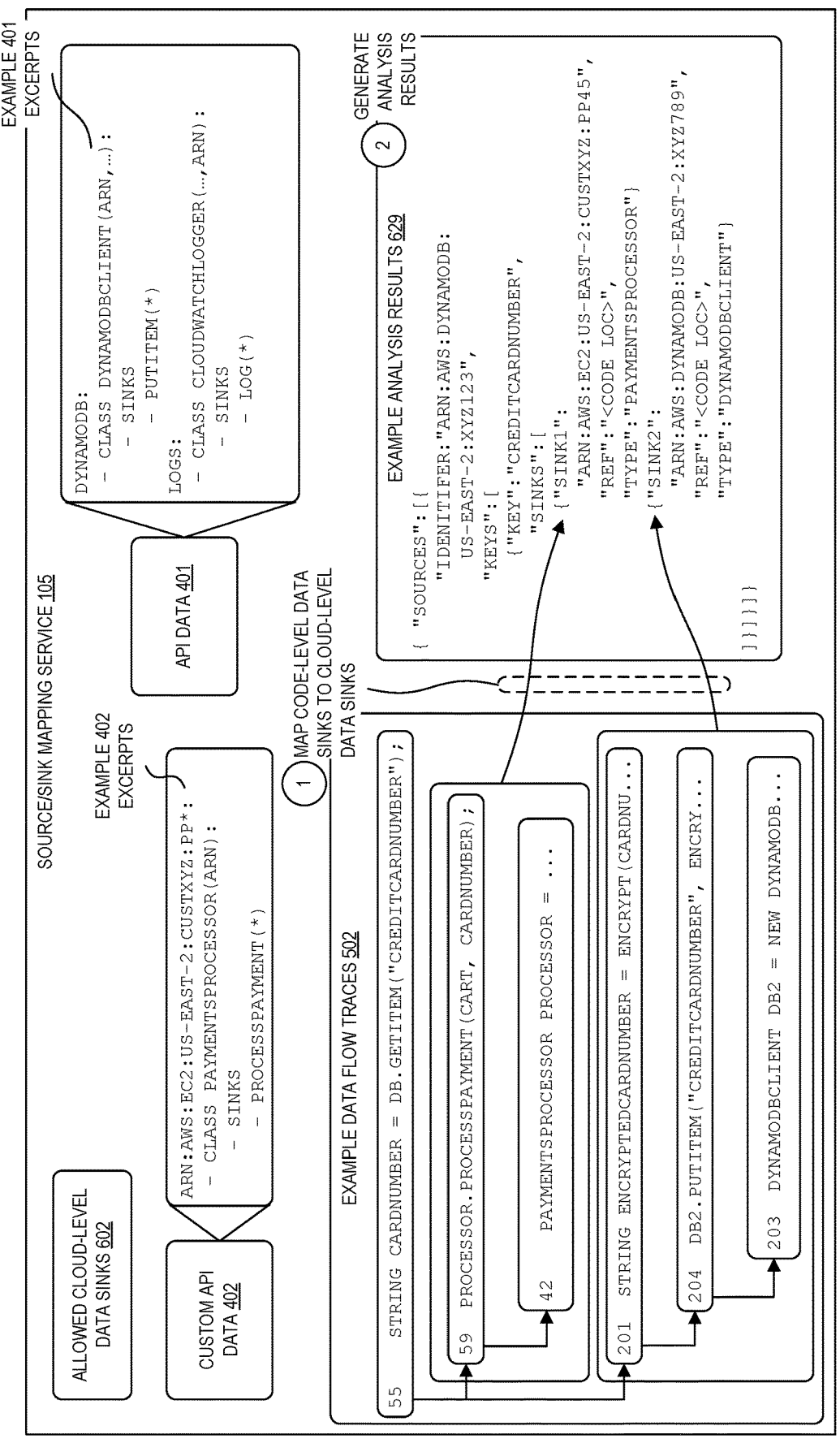
FIG. 6 illustrates code- to cloud-level data sink identification by the exemplary mapping service of the exemplary code analysis service according to some examples.

FIG. 6 illustrates code- to cloud-level data sink identification by the exemplary mapping service of the exemplary code analysis service according to some examples. Here, the mapping service 105 determines cloud-level data sinks from the traced code-level data sinks. Again, the mapping service 105 API data 401. In this mapping direction, the API data 401 provides a relation between a line or lines of code (generally referred to as a code "portion") and their cloud-level operation as a data sink.

Example API data 401 excerpts are shown. As in the cloud-to-code level data source mapping, since cloud-based data sinks are accessed through APIs, the API data 401 can enumerate the code-level mechanisms that exercise those APIs, such as described above. Here, the PUTITEM( ) method of a DYNAMODBCLIENT class instantiated with a first argument as the resource identifier is one data sink, and the log( ) method of a CLOUDWATCHLOGGER class instantiated with a last argument as the resource identifier is another data sink. Note the character indicates that any argument of the associated method can be considered a data sink. In other examples, particular arguments may be identified as data sinks.

Again, the code analysis service 101 allows a user to specify custom API data 402, which can include cloud-level data sinks. Here, the custom API data 402 excerpts include an indication that the PROCESSPAYMENT( ) method of a PAYMENTSPROCESSOR class instantiated with a resource identifier argument is a data sink.

As indicated at circle "1," using the API data 401 and the data flow traces 502 from the data flow analysis service 107, the mapping service 105 can determine the cloud-level data sinks from the code-level portions of code identified in the traces. In the illustrated example, the mapping service 105 determines through the PROCESSPAYMENT( ) call with the CARDNUMBER argument to the PAYMENTSPROCESSOR object PROCESSOR instantiated with the resource identifier indicated in FIGS. 2 and 3 that the code stores or otherwise sends the data of interest to the "ARN: AWS:EC2:US-EAST-2:CUSTXYZ:PP45" resource identifier. Similarly, the mapping service 105 determines through the PUTITEM( ) call with the ENCRYPTEDCARDNUMBER argument (from the encrypt( ) method call having the CARDNUMBER argument) to the DYNAMODBCLIENT object DB2 instantiated with the resource identifier indicated in FIGS. 2 and 3 that the code stores or otherwise sends the date of interest to the "ARN:AWS:DYNAMODB:US-EAST-2:XYZ789" resource identifier.

As indicated at circle "2," the mapping service 105 generates the analysis result based on the determined code-to cloud-level data sink mappings. An example analysis result 629 is illustrated including two data sinks, one corresponding to the cloud-level resource identifier associated with the PAYMENTSPROCESSOR PROCESSOR and another corresponding to the cloud-level resource identifier associated with the DYNAMODBCLIENT DB2. The code analysis service can send the analysis result to the user that requested the analysis.

In some examples, the code analysis service 101 can allow a user to specify allowed cloud-level data sinks 602 (e.g., included with or identified in a code analysis request). Similar to the source configuration data described above, the allowed cloud-level data sinks 602 can include an identification of one or more resource identifiers that are permitted to receive data of interest. In generating an analysis result, the mapping service can filter out any traces that are destined for data sinks having resource identifiers that correspond to those identified in data 602, reducing the number of cloud-level traces provided in the analysis result.

Figure 7:
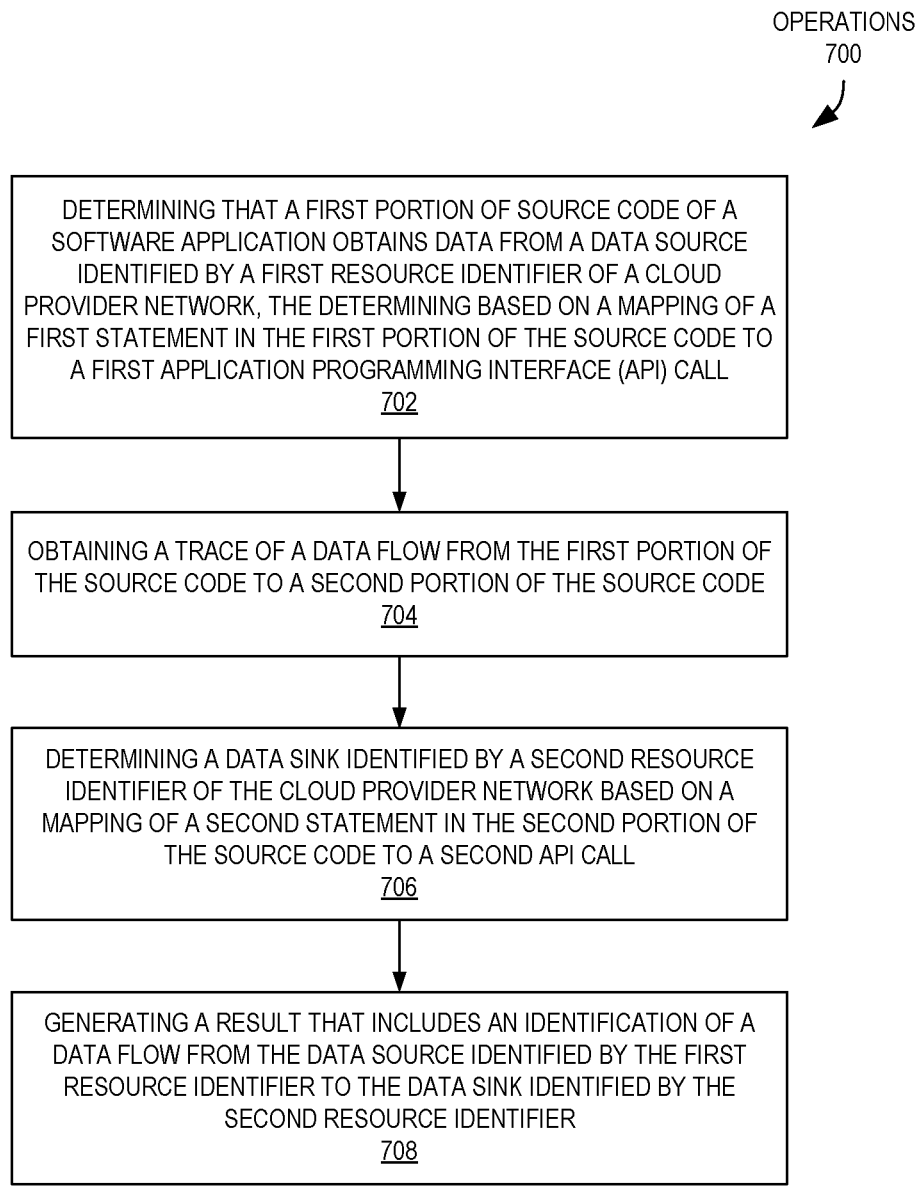
FIG. 7 is a flow diagram illustrating operations of a method for data flow analysis of cloud-based software applications according to some examples.

FIG. 7 is a flow diagram illustrating operations 700 of a method for data flow analysis of cloud-based software applications according to some examples. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the code analysis service 101 of the other figures.

The operations 700 include, at block 702, determining that a first portion of source code of a software application obtains data from a data source identified by a first resource identifier of a cloud provider network, the determining based on a mapping of a first statement in the first portion of the source code to a first application programming interface (API) call. For example, the code analysis service 101 can use API data to determine portions of code (e.g., one or more lines) that access or otherwise obtain data from cloud-level data sources such as described above including with reference to FIG. 4.

The operations 700 further include, at block 704, obtaining a trace of a data flow from the first portion of the source code to a second portion of the source code. For example, the code analysis service 101 can perform taint analysis using static code analysis techniques to trace data flows through source code such as described above including with reference to FIG. 5.

The operations 700 further include, at block 706, determining a data sink identified by a second resource identifier of the cloud provider network based on a mapping of a second statement in the second portion of the source code to a second API call. For example, the code analysis service 101 can use API data to determine portions of code (e.g., one or more lines) that access or otherwise write data to cloud-level data sinks such as described above including with reference to FIG. 6.

The operations 700 further include, at block 708, generating a result that includes an identification of a data flow from the data source identified by the first resource identifier to the data sink identified by the second resource identifier. For example, the code analysis service 101 can generate an analysis result that includes mappings between cloud-level data sources and cloud-level data sinks such as described above including with reference to FIG. 6.

In some examples, the code analysis service 101 can obtain compute environment configuration data that includes runtime variables of a computing environment of a managed compute service of the cloud provider network to execute the software application and propagate the runtime variables into associated variable statements in the source code, at least one of the first resource identifier or the second resource identifier is based at least in part on a runtime variable. Additional details on the use of runtime variables from compute environment configuration data are described above including with reference to FIG. 3.

In some examples, the first statement is associated with the first resource identifier based on a propagation of runtime environment data into a variable in the source code. For example, the DBID variable on line 33 of the example code 221 is based on a runtime variable.

In some examples, the trace of the data flow from the first portion of the source code to the second portion of the source code is contingent on a runtime variable. For example, the access to the log data sink on line 64 of the example code 221 is conditioned on a runtime variable used at line 63.

In some examples, the technique used to inject or otherwise obtain runtime data within source code is through runtime variable statements in the source code. The code analysis service 101 can determine the associated variable statements in the source code based on compute environment service data, the compute environment service data including, for each managed compute service of a plurality of managed compute services of the cloud provider network, an identification of a variable statement format associated with the managed compute service.

The relation between code-level statements and cloud-level data sources or sinks can vary. In some examples, the first statement is associated with the first resource identifier by the first resource identifier is a parameter to the first statement. In other examples, the first statement is associated with the first resource identifier by the first statement is to a method associated with object instantiated based on the first resource identifier.

In some examples, the code analysis service 101 permits the identification of data of interest for the cloud-level data flow analysis to be specified with varying degrees of specificity. For example, the data source can be identified by a key to a value in a database.

In some examples, the code analysis service 101 can determine which statement(s) to look for in the API data based on the resource identifier(s) in the source configuration data. For example, a resource identifier may include an identification of the underlying service that manages the resource, and the code analysis service 101 can use that identification to locate the API reference for that service (e.g., the "DYNAMODB" in the resource identifier in data 425 indicates the service in API data 401).

In some examples, the API call of the first statement is included in API data that includes an enumeration of a plurality of API calls supported by the managed service.

In some examples, the trace is based on a taint analysis using static code analysis techniques such as symbolic code execution or abstract code interpretation.

Figure 8:
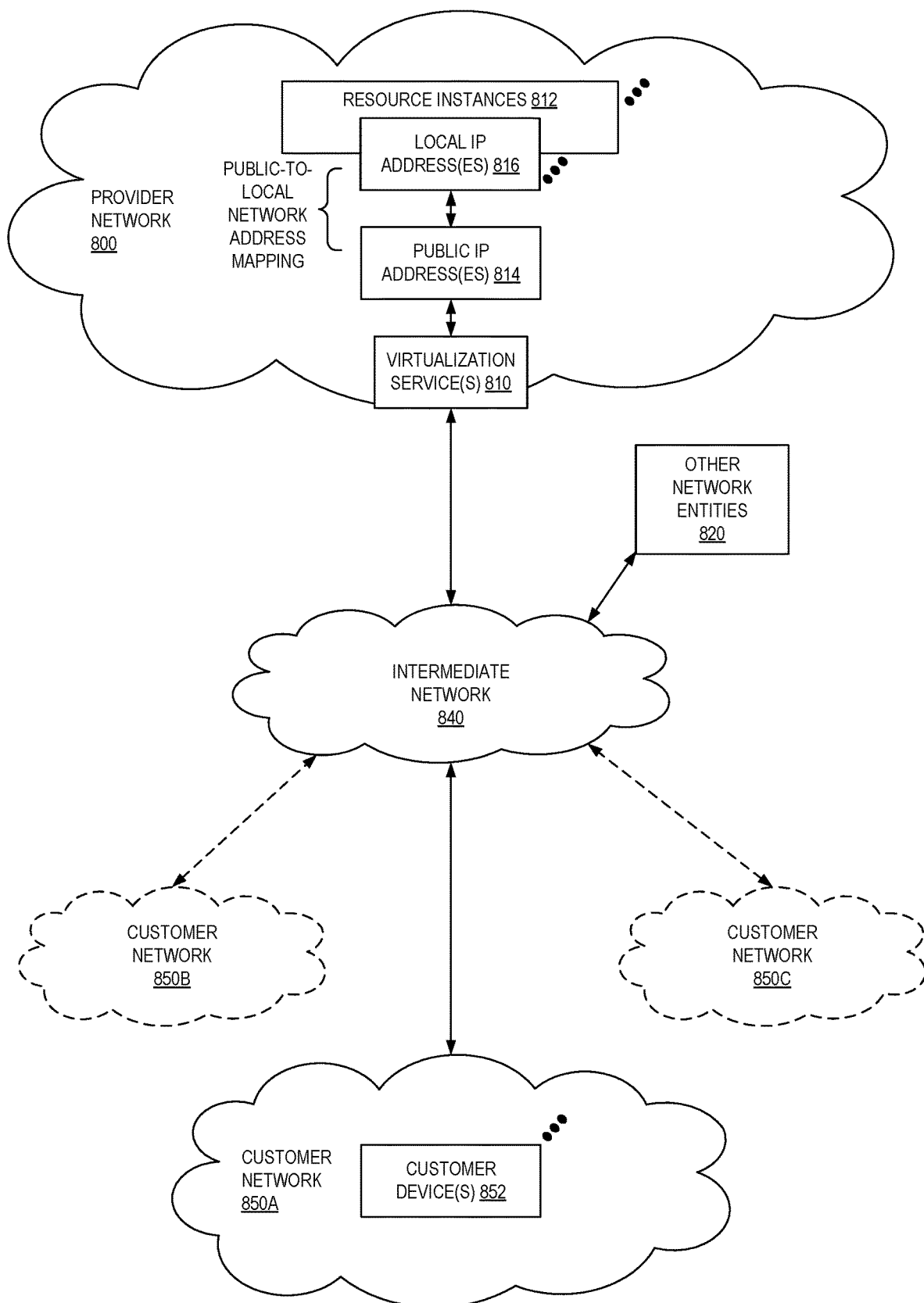
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
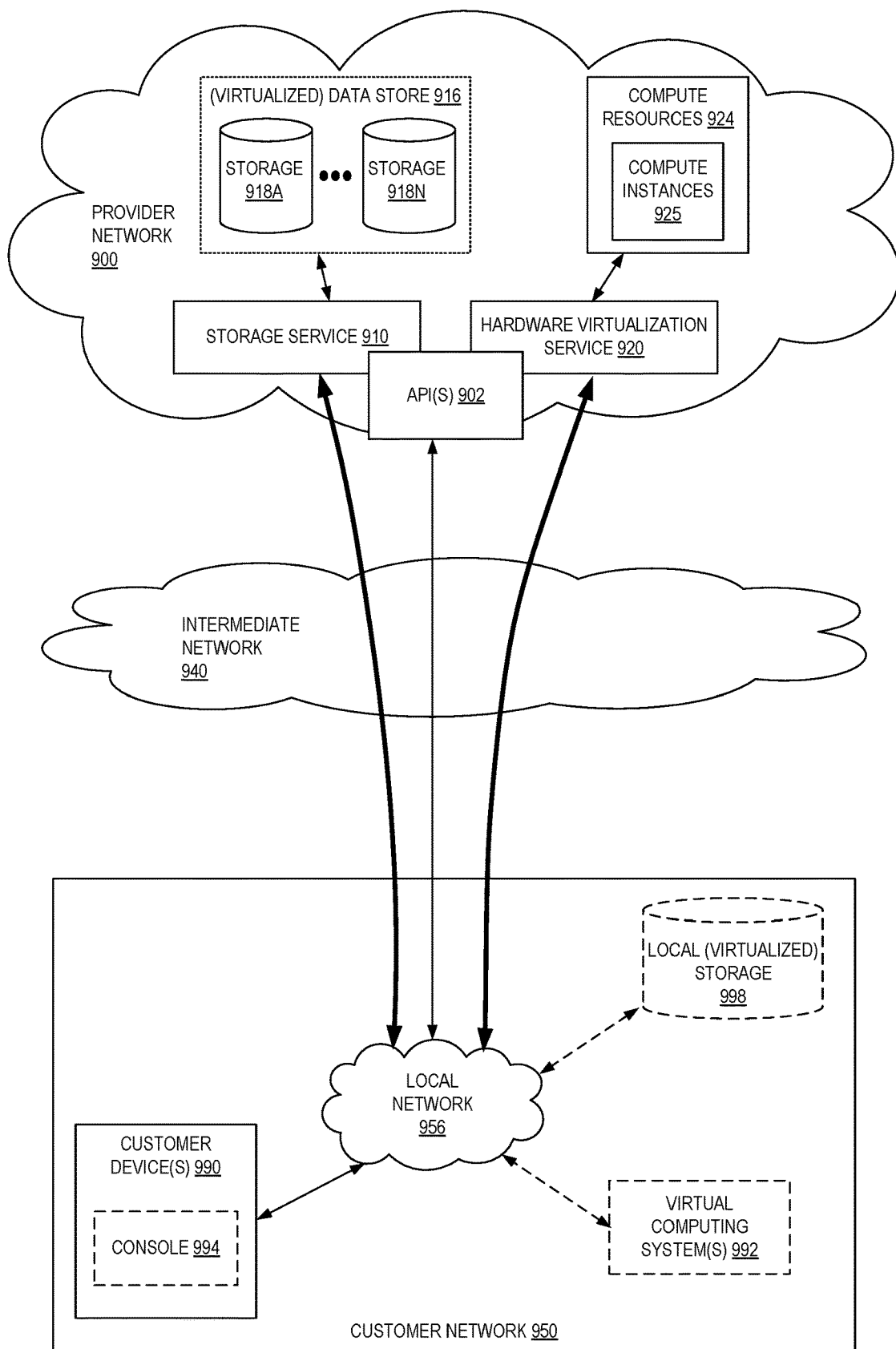
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
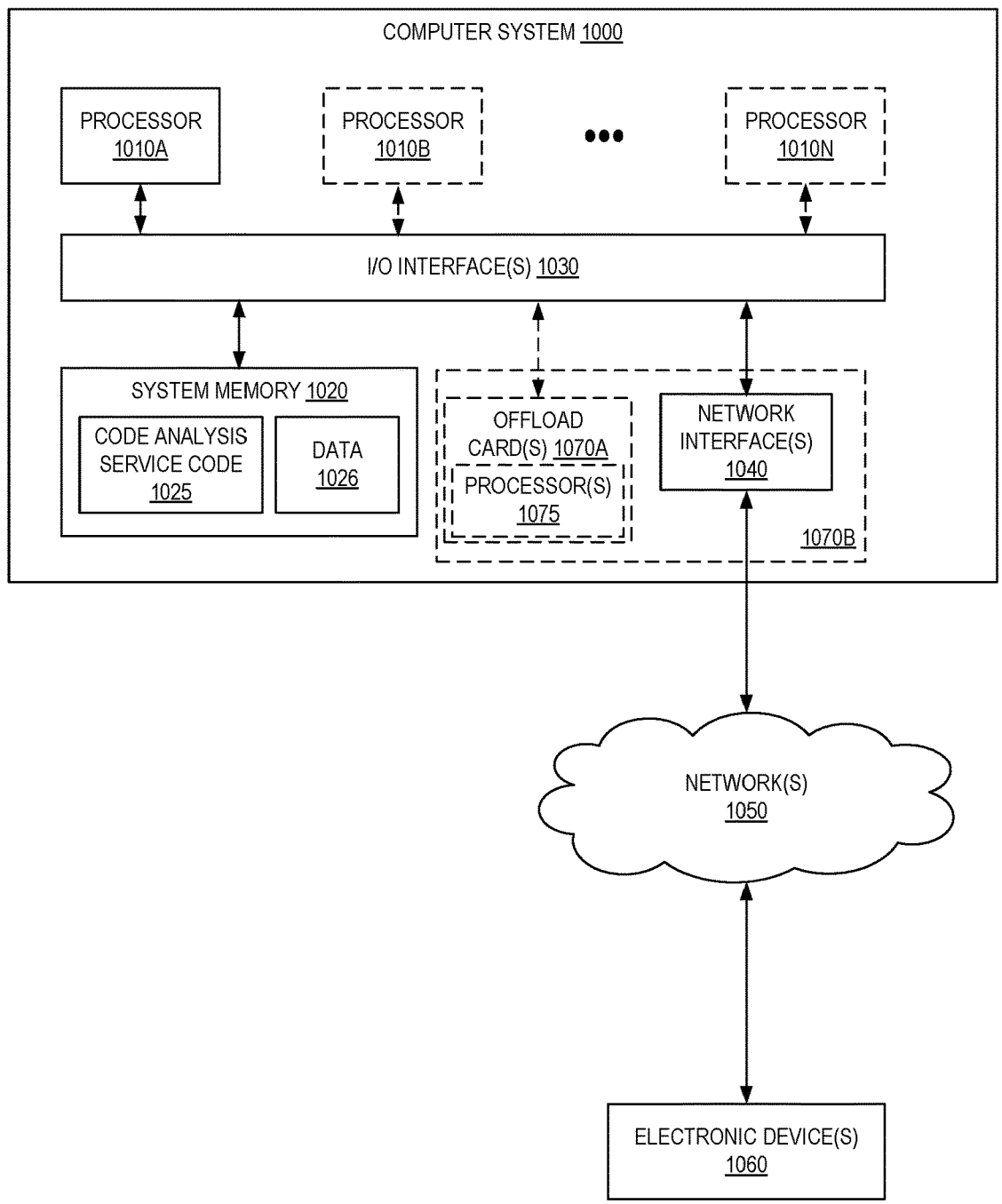
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as code analysis service code 1025 (e.g., executable to implement, in whole or in part, the code analysis service 101) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving, by a code analysis service being executed as a serverless function by one or more processors in a cloud provider network, a request to perform a data flow analysis of source code of a software application uploaded to the cloud provider network to identify data flows from a data source in the cloud provider network, the data source identified by a first resource identifier of the cloud provider network, wherein the code analysis service receives the request from an electronic device across one or more intermediate networks via an application programming interface (API) call;
obtaining, by a concretization service of the code analysis service, compute environment configuration data in response to the request that includes runtime variables of a computing environment of a managed compute service of the cloud provider network to execute the software application on cloud resources, the concretization service developing a partial context about the computing environment that the software application will run in;

loading and propagating, by the concretization service of the code analysis service, the runtime variables into associated variable statements in the source code to generate concretized source code;

mapping, by a source/sink mapping service of the code analysis service, a first statement in a first portion of the source code to a first API call;

determining, by the source/sink mapping service of the code analysis service based on the concretized source code, that the first portion of the source code of the software application obtains data from the data source identified by the first resource identifier based on the mapping of the first statement in the first portion of the source code to the first API call, wherein the first portion of the source code is based on a runtime variable of the runtime variables;

generating, by a data flow analysis service of the code analysis service based on the mapping, a trace of a data flow from the first portion of the source code to a second portion of the source code, the data flow analysis service including a code analysis engine for generating the trace;

determining, by the source/sink mapping service of the code analysis service based on the trace provided by the data flow analysis service, a data sink identified by a second resource identifier of the cloud provider network based on a mapping of a second statement in the second portion of the source code to a second API call identified in the trace;

generating, by the source/sink mapping service of the code analysis service, a result that includes an identification of a data flow from the data source identified by the first resource identifier to the data sink identified by the second resource identifier, wherein at least one of the first resource identifier or the second resource identifier is based at least in part on a runtime variable of the runtime variables; and transmitting, by the code analysis service, the result to the electronic device via the one or more intermediate networks.

2. The computer-implemented method of claim 1, wherein the first statement is associated with the first resource identifier based on a propagation of runtime environment data into a variable in the source code.

3. The computer-implemented method of claim 1, wherein the trace of the data flow from the first portion of the source code to the second portion of the source code is contingent on a runtime variable.

4. The computer-implemented method of claim 1, further comprising determining the associated variable statements in the source code based on compute environment service data, the compute environment service data including, for each managed compute service of a plurality of managed compute services of the cloud provider network, an identification of a variable statement format associated with the managed compute service.

5. The computer-implemented method of claim 1, wherein the first statement is associated with the first resource identifier by at least one of (a) the first resource identifier is a parameter to the first statement or (b) the first statement is to a method associated with an object instantiated based on the first resource identifier.

6. The computer-implemented method of claim 1, wherein the data source is further identified by a key to a value in a database, and wherein the first statement is further associated with the key.

7. The computer-implemented method of claim 1, further comprising determining an identification of a service that manages the data source based on the first resource identifier, wherein the mapping of the first statement to the first API call is based on the identification of the service.

8. The computer-implemented method of claim 7, wherein the service is a first managed service of the cloud provider network, and wherein the mapping of the first statement to the first API call is included in API data that includes an enumeration of a plurality of API calls supported by the first managed service.

9. The computer-implemented method of claim 1, wherein the trace of the data flow is based on a taint analysis using static code analysis techniques including symbolic code execution or abstract code interpretation.

10. A system comprising:
a first one or more electronic devices to implement a data source in a cloud provider network, the data source identified by a first resource identifier of the cloud provider network; and a second one or more electronic devices to implement a code analysis service executed as a serverless function in the cloud provider network, the code analysis service including instructions that upon execution by one or more processors cause the code analysis service to:

receive a request to perform a data flow analysis of source code of a software application uploaded to the cloud provider network to identify data flows from a data source in the cloud provider network, wherein the code analysis service receives the request from an electronic device across one or more intermediate networks via an application programming interface (API) call;

obtain, by a concretization service of the code analysis service, compute environment configuration data in response to the request that includes runtime variables of a computing environment of a managed compute service of the cloud provider network to execute the software application on cloud resources, the concretization service developing a partial context about the computing environment that the software application will run in;

load and propagate, by the concretization service of the code analysis service, the runtime variables into associated variable statements in the source code of the software application to generate concretized source code;

map, by a source/sink mapping service of the code analysis service, a first statement in a first portion of the source code to a first API call;

determine, by the source/sink mapping service of the code analysis service based on the concretized source code, that the first portion of the source code of the software application obtains data from the data source identified by the first resource identifier based on the mapping of the first statement in the first portion of the source code to the first API call, wherein the first portion of the source code is based on a runtime variable of the runtime variables;

generate, by a data flow analysis service of the code analysis service based on the mapping, a trace of a data flow from the first portion of the source code to a second portion of the source code, the data flow analysis service including a code analysis engine for generating the trace;

determine, by the source/sink mapping service of the code analysis service based on the trace provided by the data flow analysis service, a data sink identified by a second resource identifier of the cloud provider network based on a mapping of a second statement in the second portion of the source code to a second API call identified in the trace;

generate, by the source/sink mapping service of the code analysis service, a result that includes an identification of a data flow from the data source identified by the first resource identifier to the data sink identified by the second resource identifier, wherein at least one of the first resource identifier or the second resource identifier is based at least in part on a runtime variable of the runtime variables; and transmit the result to the electronic device via the one or more intermediate networks.

11. The system of claim 10, wherein the first statement is associated with the first resource identifier based on a propagation of runtime environment data into a variable in the source code.

12. The system of claim 10, wherein the trace of the data flow from the first portion of the source code to the second portion of the source code is contingent on a runtime variable.

13. The system of claim 10, wherein the code analysis service includes further instructions that upon execution cause the code analysis service to determine the associated variable statements in the source code based on compute environment service data, the compute environment service data including, for each managed compute service of a plurality of managed compute services of the cloud provider network, an identification of a variable statement format associated with the managed compute service.

14. The system of claim 10, wherein the first statement is associated with the first resource identifier by at least one of (a) the first resource identifier is a parameter to the first statement or (b) the first statement is to a method associated with an object instantiated based on the first resource identifier.

15. The system of claim 10, wherein the data source is further identified by a key to a value in a database, and wherein the first statement is further associated with the key.

16. The system of claim 10, wherein the code analysis service includes further instructions that upon execution cause the code analysis service to determine an identification of a service that manages the data source based on the first resource identifier, wherein the mapping of the first statement to the first API call is based on the identification of the service.

17. The system of claim 16, wherein the service is a first managed service of the cloud provider network, and wherein the mapping of the first statement to the first API call is included in API data that includes an enumeration of a plurality of API calls supported by the first managed service.

18. The system of claim 10, wherein the trace of the data flow is based on a taint analysis using static code analysis techniques including symbolic code execution or abstract code interpretation.

* * * * *